P. WHIMSTER.
BRACKET.
APPLICATION FILED JAN. 4, 1919.

1,317,903.

Patented Oct. 7, 1919.

Inventor
P. Whimster
by Schuster & Co.
atty's

UNITED STATES PATENT OFFICE.

PETER WHIMSTER, OF WINNIPEG, MANITOBA, CANADA.

BRACKET.

1,317,903.  Specification of Letters Patent.  Patented Oct. 7, 1919.

Application filed January 4, 1919. Serial No. 269,681.

*To all whom it may concern:*

Be it known that I, PETER WHIMSTER, of the city of Winnipeg, in the Province of Manitoba, Canada, have invented certain new and useful Improvements in Brackets, of which the following is the specification.

The invention relates to improvements in brackets and the principal object of the invention is to construct a bracket which will readily grip and hold two objects and which is arranged so that one of the gripped objects can be swung to an adjusted position and held in that position.

With the above object in view the invention consists essentially in the arrangement and construction of parts hereinafter more particularly described and later pointed out in the appended claims, reference being had to the accompanying drawing in which:—

In the drawing like characters of reference indicate corresponding parts in the several figures.

This bracket is particularly designed for holding flag staffs or such decorative articles adjustable in respect to a fixed support such as say the wind shield of an automobile and the arrangement is such that one can readily attach the bracket to the wind shield and insert a flag staff and then adjust the catch holding the staff as wished in respect to the wind shield.

While I have disclosed the above use of the bracket, it will be readily understood that the bracket could be used in a diversity of places with equal effect.

Figure 2:
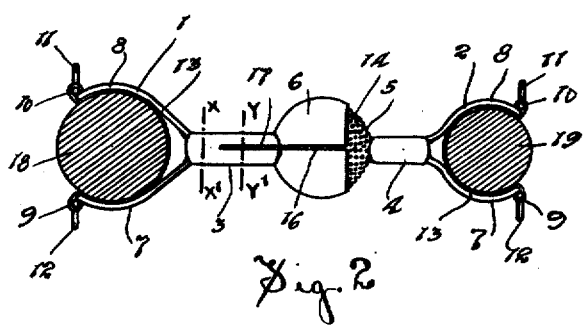
Fig. 2 represents a plan view of the bracket.
Figures 4, 5:
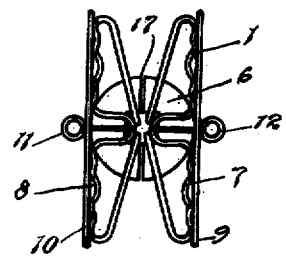
Fig. 4 represents an enlarged detailed vertical sectional view through the bracket at X—X' Fig. 2.
Fig. 5 represents an enlarged detailed vertical sectional view through the bracket at Y—Y' Fig. 2.

1 and 2 represent two similar flexible gripping catches, both of which are fitted with extending shanks 3 and 4, the inner ends of the shanks being adjustably connected together by means of a ball 5 received within a socket 6, the ball and socket being formed at the inner ends of the shanks. Preferably the catches are formed from spring wire bent in the manner shown to provide pairs of opposing gripping fingers 7 and 8, the fingers being curved as best shown in Fig. 2 so that they will receive a circular object. Reinforcing rods 9 and 10 cross and are secured to the outer tips of the fingers and the rods are fitted with outwardly extending eyes 11 and 12 supplied so that one by catching the eyes can readily spread the fingers to release them from the object gripped.

13 represents a fabric located on the inner sides of the fingers of each catch and having the edges thereof fastened to the rods 9 and 10. The fabric in each instance is designed to prevent the fingers from scratching or otherwise harming the gripped object.

The ball 5 located at the inner end of the shank 4 is provided with a roughened surface, this actually being formed by providing rounded knobs 14 on the face of the ball. The knobs are designed to enter or fit into rounded cavities 15 formed on the inner face of the socket 6.

In the present instance the socket is split into four sections by making four distinct cuts indicated at 16 through the socket and into the shank, the cuts being positioned ninety degrees apart.

In actual practice the socket fits the ball snugly and the slots extending into the shank form spring arms 17 each of which carries a socket segment.

In this way it will be seen that under normal circumstances the ball will remain stationary or set in any position but should one wish to adjust the catch 2 in respect to catch 1, he grasps the catch 2 and forcibly rotates the ball, this causing the knobs to escape out of the original cavities and enter new cavities. This is permissible owing to the fact that the socket sections can spring apart due to the resiliency provided in the spring arm 17.

In using the bracket one catches a support such as the side 18 of the wind shield of an automobile with one end of the bracket and the staff 19 of a flag with the other and then adjusts the flag carrying end of the bracket in whatever position he pleases by turning the ball within the socket in the manner above disclosed. The fabric linings supplied prevent the fingers of the catches from scratching or otherwise harming the gripped objects as will be readily understood.

Figures 7, 8:
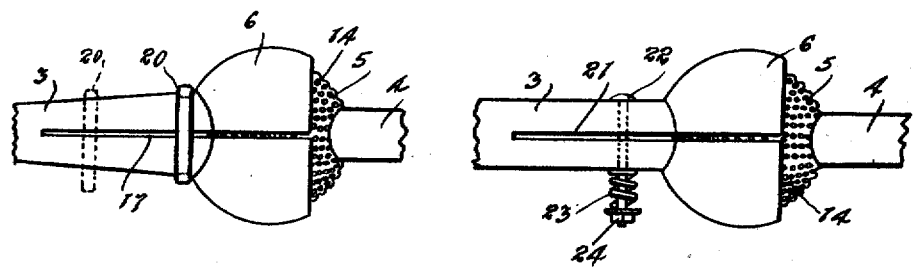
Fig. 7 represents a modified form of the bracket.
Fig. 8 represents a still further modified form of the bracket.

In Fig. 7 where a modification of the device is shown the sections of the socket are held together around the ball by an applied ring 20 and the shank 3 is tapered so that when the ring is drawn back to the position as shown in dotted outline the split sections of the shank are free and spring apart, thereby releasing the socket sections from the ball and permitting of the adjustment of the ball. In this form the spring arms 17 are designed to have a normal spreading action which is restrained by the ring when the ring is in the position as shown in full outline.

Figure 1:
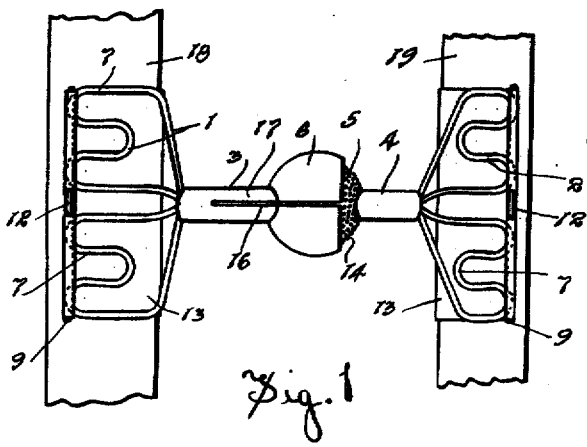
Figure 1 represents a side view of my bracket as it appears when in use.
Figure 6:
Fig. 6 represents an enlarged detailed fragmentary view of engaging portions of the ball and socket.
Figure 3:
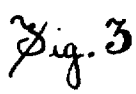
Fig. 3 represents an end view thereof with the protecting fabric removed.

Here I might remark that the action of the spring arms in this latter case is opposite to the action in Fig. 1 where the spring arms have a natural tendency to hold the socket sections on to the ball. In the modified form shown in Fig. 8 the socket and arm is split with a single cut 21 and a bolt 22 is passed through the end of the shank adjacent the socket and is fitted on the underside with a coiled compression spring 23, engaging a nut 24.

Obviously the spring serves to normally hold the socket sections gripped on the ball while permitting of the spreading of the sections when the ball is turned.

What I claim as my invention is:—

1. A bracket comprising a pair of similar gripping catches formed from spring wire shaped to present opposing pairs of curved fingers, a universal joint connecting the catches and a fabric lining covering the inner faces of the fingers.

2. A bracket comprising a pair of similar gripping catches formed from spring wire shaped to present opposing pairs of curved fingers, a universal joint connecting the catches, a fabric lining covering the inner faces of the fingers, reinforcing rods connecting the tips of the fingers and eyes secured to the rods.

Signed at Winnipeg this 14th day of December, 1918.

PETER WHIMSTER.

In the presence of—
G. S. ROXBURGH,
K. B. WAKEFIELD.

Copies of this patent may be obtained for five cents each, by addressing the "Commissioner of Patents, Washington, D. C."